US006272487B1

(12) United States Patent
Beavin et al.

(10) Patent No.: US 6,272,487 B1
(45) Date of Patent: *Aug. 7, 2001

(54) QUERY OPTIMIZATION THROUGH THE USE OF MULTI-COLUMN STATISTICS TO AVOID THE PROBLEMS OF NON-INDEXED COLUMN CORRELATION

(75) Inventors: Thomas Abel Beavin, Milpitas; Balakrishna Raghavendra Iyer, San Jose; Akira Shibamiya, Los Altos; Hong Sang Tie, Morgan Hill; Min Wang, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/277,612

(22) Filed: Mar. 26, 1999

Related U.S. Application Data (63) Continuation of application No. 08/808,521, filed on Feb. 28, 1997.

(51) Int. Cl.[7] ................................................... G06F 17/30

(52) U.S. Cl. .................................................................. 707/2

(58) Field of Search ................................... 707/1, 2, 3, 4, 707/5

(56) References Cited

U.S. PATENT DOCUMENTS

| | | |
|---|---|---|
| 5,335,345 | 8/1994 | Frieder et al. . |
| 5,412,806 | 5/1995 | Du et al. . |
| 5,469,568 | 11/1995 | Schiefer et al. . |
| 5,761,653 | 6/1998 | Schiefer et al. . |
| 5,802,521 | * 9/1998 | Ziauddin et al. ................... 707/101 |
| 5,899,986 | 5/1999 | Ziauddin . |

OTHER PUBLICATIONS

Gassner, P. et al.,"Query Optimization in the IBM DB2 Family," *Bulletin of the Technical Committee on Data Engineering*, IEEE Computer Society, Dec. 1993, vol. 16, No. 4, pp. 4–18.

*DB2 for MVS/ESA Administration Guide*, vol. 2, 2Version 4, pp. 5–210 to 5–213, 5–233, and 5–287.

* cited by examiner

*Primary Examiner*—Jack Choules
(74) *Attorney, Agent, or Firm*—Gates & Cooper LLP

(57) ABSTRACT

The system, method, and program of this invention collects multi-column statistics, by a database management system, to reflect a relationship among multiple columns of a table in a relational database. These statistics are stored in the system catalog, and are used during query optimization to obtain an estimate of the number of qualifying rows when a query has predicates on multiple columns of a table.

A multi-column linear quantile statistic is collected by dividing the data of multiple columns into sub-ranges where each sub-range has approximately an even distribution of data, and determining a frequency and cardinality of each sub-range. A multi-column polygonal quantile statistic is collected by dividing the data of multiple columns into sub-spaces where each sub-space contains approximately the same number of tuples, and determining a frequency and cardinality of each sub-space.

The system catalog is accessed for the stored multi-column linear quantile statistic for a query having a single range predicate and at least one equal predicate to determine the selectivity value for the predicates of the query. The system catalog is accessed for the stored multi-column polygonal quantile statistic for a query having more than one range predicate. These statistics are used in various ways to determine the selectivity value for the predicates of the query.

37 Claims, 6 Drawing Sheets

QUERY OPTIMIZATION THROUGH THE USE OF MULTI-COLUMN STATISTICS TO AVOID THE PROBLEMS OF NON-INDEXED COLUMN CORRELATION

This application is a Continuation of application Ser. No. 08/808,521, filed Feb. 28, 1997, which application is incorporated herein by reference.

A portion of the disclosure of this patent document contains material which is subject co copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to a database management system for optimizing queries, and more specifically for determining an estimation for a number of qualified rows of a query (i.e., a selectivity value), e.g., for use in determining optimized access paths.

2. Description of the Related Art

Databases are computerized information storage and retrieval systems. A relational database management system (RDBMS) is a database management system (DBMS) which uses relational techniques for storing and retrieving data. A DBMS is structured to accept commands to store, retrieve, and delete data. One widely used and well known set of commands is called the Structured Query Language (SQL).

Relational databases are organized into tables which consist of rows and columns of data. The rows are formally called tuples. A database will typically have many tables and each table will typically have multiple columns. The tables are typically stored on random access storage devices (DASD) such as magnetic or optical disk drives for semi-permanent storage.

Tables are at the center of a relational database engine; and a major goal of the underlying query compiler is to provide a suite of mechanisms so that user data can be easily stored and efficiently manipulated.

An important function of query optimization is estimating the number of qualified rows accurately. This estimation is used to determine an optimized access path by the DBMS to the data. An inherent problem occurs during this estimation process when the query has predicates (local or join) on multiple columns of a table. Most database optimizers make an assumption that there is no relationship between those predicates; and they evaluate the predicates independently when estimating the number of qualified rows. This independence assumption, however, may, in many cases, be incorrect and may cause a very inaccurate qualifying row estimate. The following example illustrates this problem.

SELECT*FROM INVENTORY_TABLE
  WHERE CURR_LOCATION='LOC1'
    AND ORIG_LOCATION='LOC1'
Number of rows in INVENTORY_TABLE=500,000
Number of distinct values in CURR_LOCATION=50
Number of distinct values in ORIG_LOCATION=50

Selectivity is the percentage of rows that would qualify. Selectivity of "CURR_LOCATION='LOC1'" is evaluated to be="0.02" (i.e., one out of every fifty rows would qualify). Selectivity of "ORIG_LOCATION='LOC1'" is evaluated to be="0.02". The number of qualified rows from INVENTORY_TABLE is evaluated to be:

(0.02*0.02)*500000=200

In the previous example the optimizer assumed that there was no relationship between the two predicates in the query and evaluated them as if they were independent. In this case, however, assume that most items in the INVENTORY_TABLE have the same value for both the CURR_LOCATION and ORIG_LOCATION columns. In this case the actual number of rows that qualified would be much larger than the estimated number.

One type of statistic that takes into consideration multiple columns is called "FULLKEYCARD". A "FULLKEYCARD" concatenates all of the columns in an index for indicating the number of distinct key values in an index. It has been previously used by DB2/MVS and other RDBMS vendors. While FULLKEYCARD does help with column correlation in limited circumstances, it has its limitations. For example, FULLKEYCARD can only be used for an index that has the same set of predicates that are in the query. Since it cannot be applied to non-indexed columns, it is not very well suited to solve the problem of column correlation discussed above.

SUMMARY OF THE INVENTION

It is therefore an object of this invention to improve performance for queries that have predicates on multiple columns of a table.

It is a further object of this invention to take into consideration the relationship between predicates when estimating the number of qualified rows from columns in a query.

It is a further object of this invention to use multi-column statistics to compute an estimate of the number of qualified rows when a query has predicates on multiple columns of a table.

This invention reduces the problem caused by column correlation during query optimization by removing the independence assumption when a new type of multi-column statistic is available. The system, method, and program of this invention collects multi-column statistics by relational DBMSs, and uses these statistics during query optimization to obtain an estimate of the number of qualifying rows when a query has predicates on multiple columns of a table.

The DBMS collects meaningful statistical data from the table of a database by analyzing the actual data in the database. The DBMS then stores the statistics in the DBMS system catalogs, i.e., tables, and applies this data to determine in advance a number of qualifying rows in order to further optimize the query based on (i.e., dependent upon) this number of estimated qualifying rows.

A database optimizer calculates a combined predicates filter factor when these predicate's columns are correlated. The optimizer chooses among point, linear or polygonal statistics.

More specifically, the system, method, and program of this invention collects multi-column statistics to reflect a relationship among multiple columns of a table. A multi-column cardinality statistic is collected by concatenating columns and counting the number of distinct concatenated values. A multi-column frequent value statistic is collected by concatenating columns and determining a frequency of the concatenated values. A multi-column linear quantile statistic is collected by dividing the data of multiple columns into sub-ranges where each sub-range has approximately an even distribution of data, and determining a frequency and cardinality of each sub-range. A multi-column polygonal quantile statistic is collected by dividing the data of multiple columns into sub-spaces where each sub-space contains approximately the same number of tuples, and determining a frequency and cardinality of each sub-space. Although only one sub-space can be used, accuracy will increase with increasingly more sub-spaces.

These statistics are stored in a table such as the system catalogs of the database management system.

The system catalog is accessed for the stored multi-column cardinality statistic or for the multi-column frequent value for a query having equal predicates. A selectivity value is determined as the inverse of the cardinality statistic; or the frequency of the frequent value statistic if there are multi-column frequent value statistics for the same columns as the equal predicates in the query, and the literals in the predicates match the literals in the stored multi-column frequent value. If the literals in the predicates do not match the literals in the stored multi-column frequent value, then a selectivity value is determined as:

$$\frac{(1 - \text{SUM(Frequency of all multi-column frequent values)})}{(\text{"multi-column" cardinality}) - (\text{number of "multi-column" frequent values})}.$$

The system catalog is accessed for the stored multi-column linear quantile statistic for a query having a single range predicate and at least one equal predicate to determine the selectivity value for the predicates of the query. For predicates that are completely satisfied by only one of the sub-ranges, the selectivity value is the frequency. Otherwise, the selectivity is determined by the selectivity of the fully-qualified sub-ranges plus a selectivity of partially qualified sub-ranges. This selectivity determination translates a boundary of a sub-range by concatenating a set of values of a lower boundary and concatenating a set of values of a higher boundary. The selectivity determination then utilizes this set of concatenated values.

The system catalog is accessed for the stored multi-column polygonal quantile statistic for a query having more than one range predicates to determine the selectivity value for the predicates of the query by adding up the selectivity of the fully and partially qualified sub-spaces. The selectivity of a partially qualified sub-space is determined according to the following:

$$\frac{(X1 - X2 + 1) * (Y1 - Y2 + 1) * (Z1 - Z2 + 1) \ldots}{(XA - XB + 1) * (YA - YB + 1) * (ZA - ZB + 1) \ldots} * \text{frequency for quantile}$$

Where:
X1, X2 are the high and low bounds for the X-coordinate of the query
Y1, Y2 are the high and low bounds for the Y-coordinate of the query
Z1, Z2 are the high and low bounds for the Z-coordinate of the query
. . . etc., for each coordinate (dimension) of the query
XA, XB are the high and low bounds for the X-coordinate of the quantile
YA, YB are the high and low bounds for the Y-coordinate of the quantile
ZA, ZB are the high and low bounds for the Z-coordinate of the quantile
. . . etc., for each coordinate (dimension) of the quantile.

The selectivity value is used by a query optimizer to further optimize the processing of the query such as by selecting an optimized access path to the data based upon the selectivity value. The various uses of selectivity values for query processing are well-known in the art. However, a system, method, and program product utilizing this invention will use a selectivity value that reflects dependencies among predicates of a query. Consequently the selectivity value is assumed to be a truer estimate of the number of qualifying rows on which further query processing optimizations can be based for better optimizations for certain queries.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

The following terms are used herein:
Cardinality (CARD)—is a number of distinct values.
Frequency—is the percentage of all occurrences for all values that a specific value occurs.
Selectivity—is an estimated number of qualifying rows in a query.
Qualified (or qualifying) rows—are rows that satisfy the search conditions specified by the query.

Figure 6A:
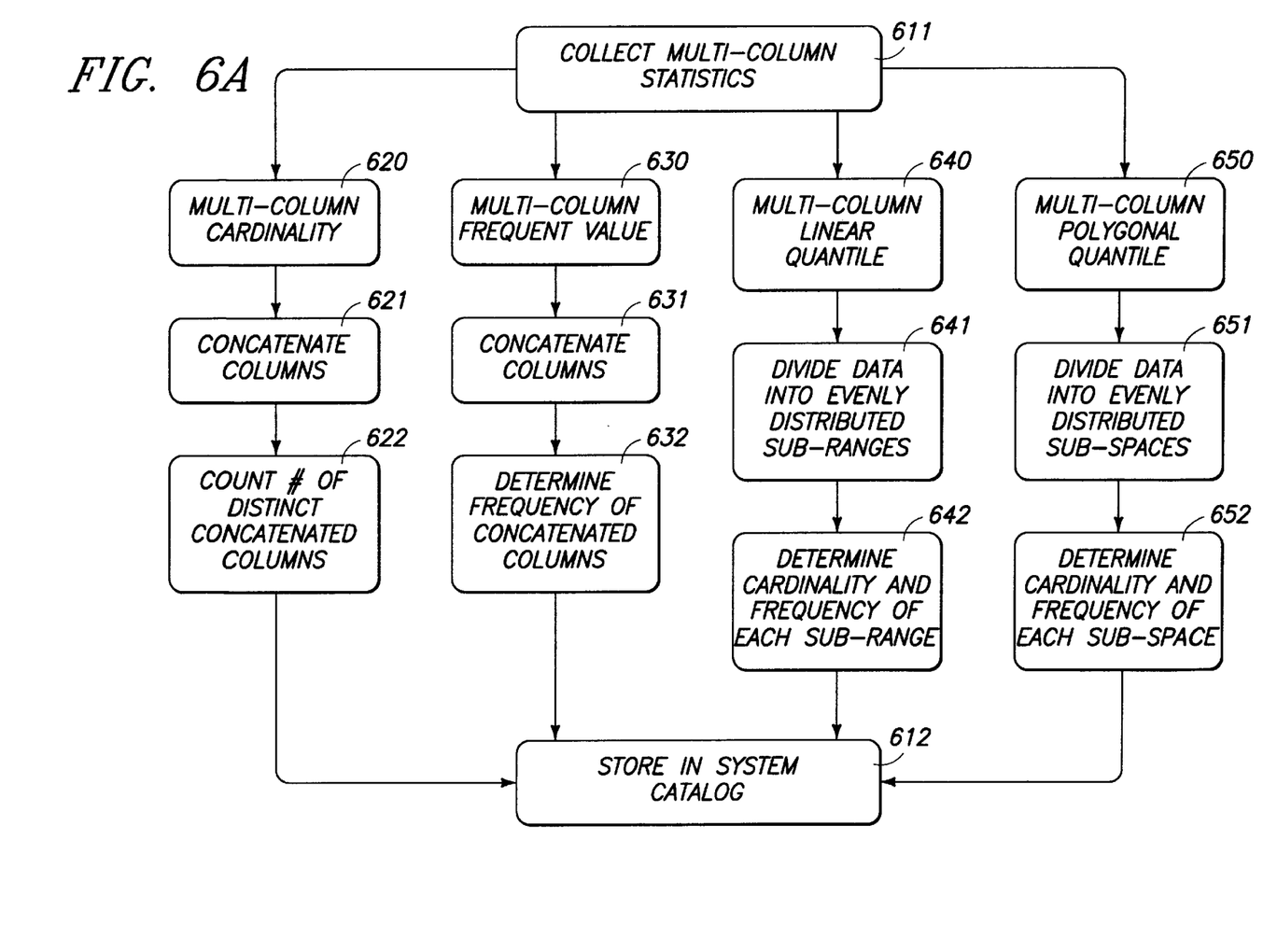
FIGS. 6A–6B together is a process flow of a system, method, and program product for collecting, storing, and using multi-column statistics.
Figure 6B:
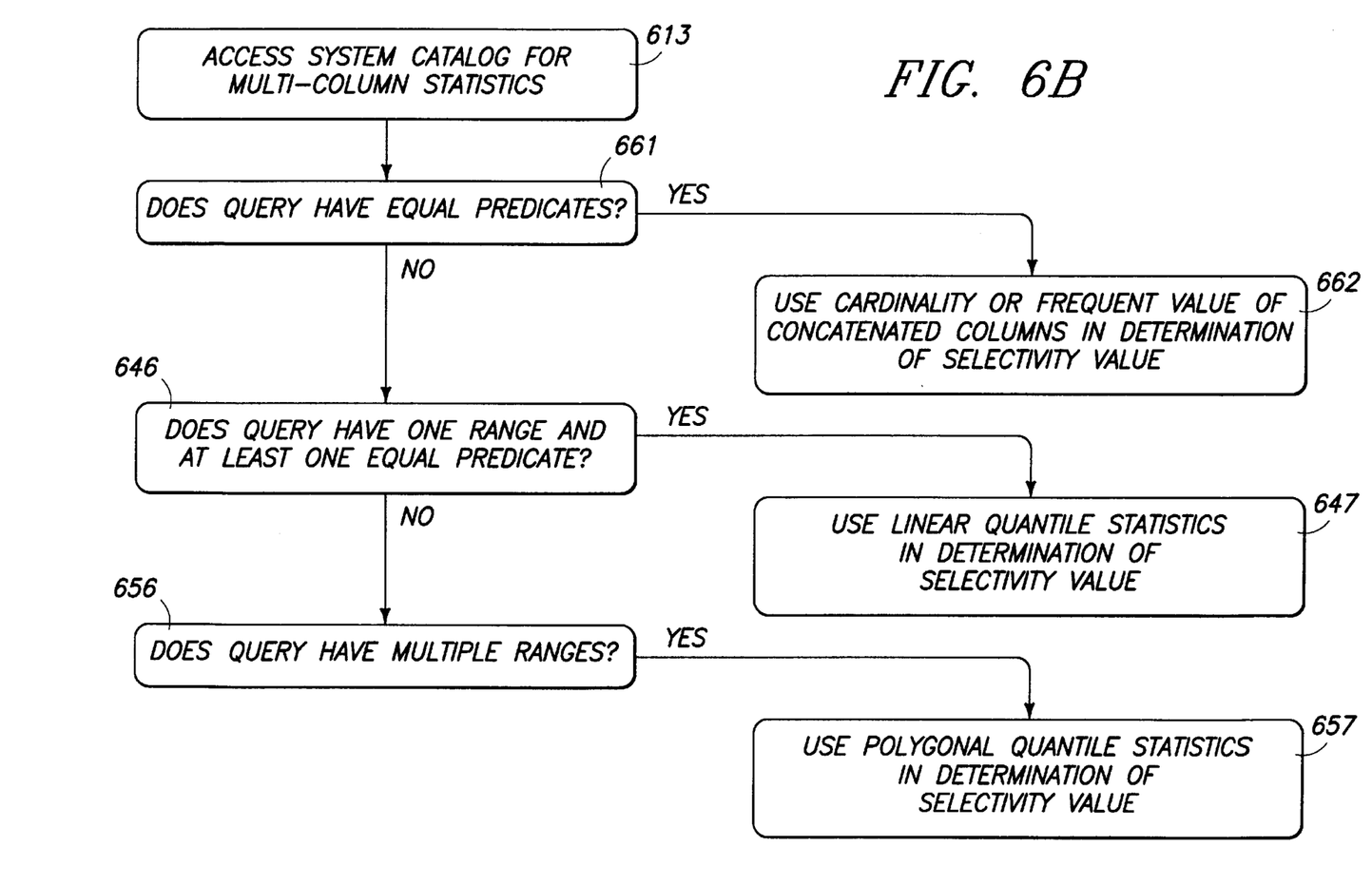

FIGS. 6A and 6B together illustrate the overall process flow of collecting, storing, and using multi-column statistics. FIG. 6A and 6B will be referred to throughout the following description of the preferred embodiment.

There are many different types of column correlation during query optimization. The following identifies the basic types addressed in this invention.

Types of Column Correlation
  'Point' Correlation
This type of column correlation occurs between equal predicates on multiple columns of the same table. For example:

COLX=4 AND COLY=1

Figure 1:
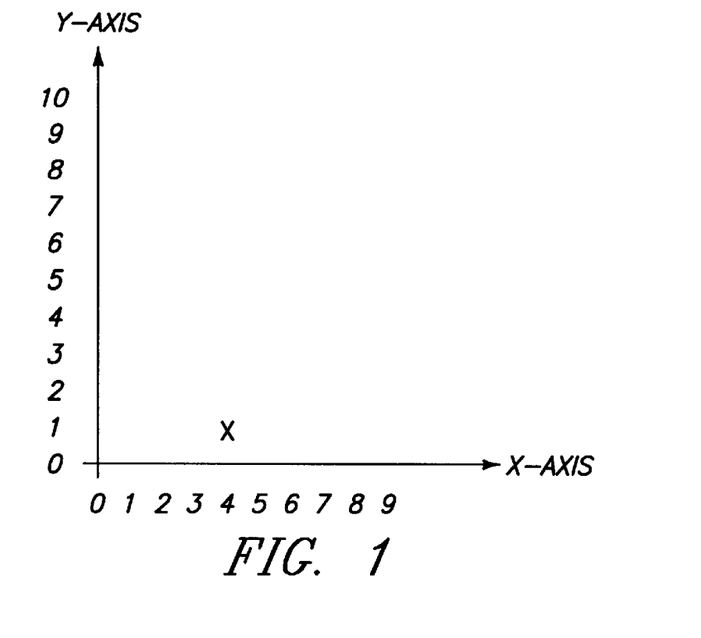
FIG. 1 is a graph representation where all tuples that satisfy equal predicates on multiple columns of the same table form a point where the "x" coordinate has the values of column X (COLX) and the "y" coordinate has the values of column Y (COLY), whereby a type of column correlation called point correlation is being illustrated.

If the set of all tuples that satisfied these two predicates were plotted on a graph with 'x' coordinate being the values of COLX and the 'y' coordinate being the values of COLY they would all be contained with the same 'point' on the graph (i.e., all tuples would have the same coordinates), as shown in FIG. 1. In this example, all tuples satisfying the predicates: 'COLX=4 AND COLY=1' have the coordinates (4,1).

'Linear' Correlation

This type of correlation occurs between a single range predicate and one or more equal predicates. For example:

COLX=3 AND COLY BETWEEN 2 AND 7

Figure 2:
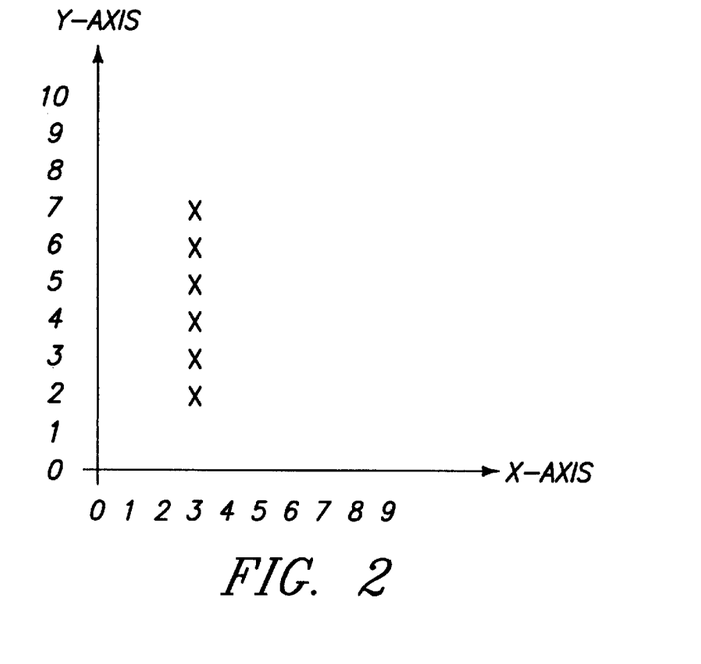
FIG. 2 is a graph representation where all tuples that satisfy a single range predicate (as shown along the y-axis) and one or more equal predicates (as shown along the x-axis) on multiple columns of a same table form a line (or segment), whereby a type of column correlation called linear correlation is being illustrated.

In this case, if the set of all tuples that satisfied these predicates were plotted on a graph it would form a line (or segment) as shown in FIG. 2.

'Polygonal' Correlation

This type of correlation involves multiple range predicates. For example:

COLX BETWEEN 3 AND 7 AND COLY BETWEEN 2 AND 7

Figure 3:
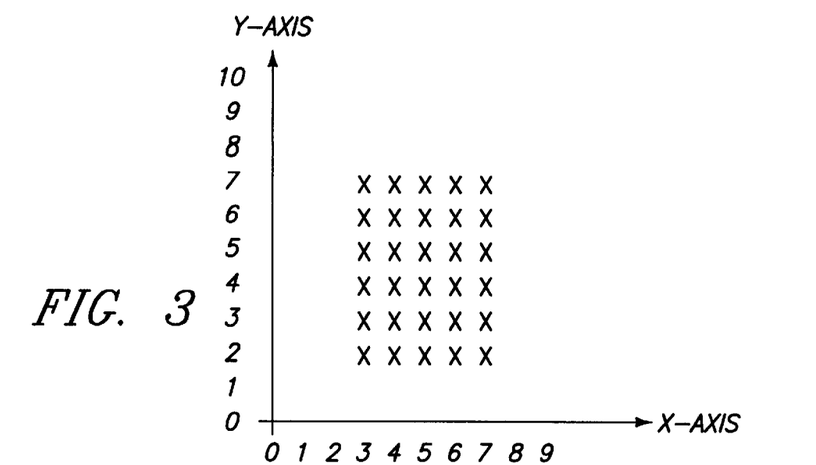
FIG. 3 is a graph representation where all tuples that satisfy multiple range predicates on multiple columns of the same table form a polygon, whereby a type of columns correlation called polygonal correlation is being illustrated.

In this case, the set of all tuples that satisfy the predicates form a polygon when plotted on a graph as shown in FIG. 3.

Multi-Column Statistics

With all three type of column correlation the object of this invention is the same. That is, to estimate the number of tuples that satisfy the predicates as accurately as possible. To that end, a new type of statistic, referred to herein as a multi-column statistic, is introduced. Each type of correlation requires a different type of multi-column statistic as discussed below.

'Point' Correlation Statistics

The following two types of statistics handle 'point' correlation problems. They are:

Multi-column cardinalities 620 (FIG. 6A).

Multi-column frequent values 630 (FIG. 6A).

These statistics are very similar to their single column counterparts. The only difference is that they represent a concatenation of columns rather than a single column. In essence, the columns are concatenated 621, 631 (FIG. 6A) and treated as a single column. Unlike a "FULLKEY-CARD" which takes into consideration all of the columns of an index, the multi-column cardinality statistic can take into consideration selected columns, i.e., a subset of the columns, from an index and/or a table. Likewise, the multi-column frequent values statistic can take into consideration selected columns from an index or table.

A multi-column cardinality represents the number of distinct values for a set of columns, 622 (FIG. 6B). For example, given the following rows in a table:

| COLX | COLY |
|------|------|
| 1 | 5 |
| 1 | 5 |
| 2 | 4 |
| 3 | 3 |
| 3 | 2 |
| 4 | 1 |
| 4 | 1 | the cardinality for the concatenated columns COLX and COLY is 5. A query which has the predicates, COLX=? AND COLY=? will have a selectivity of 0.2 (i.e., 1 out of every 5 rows is estimated to qualify) using this multi-column statistic rather than a selectivity of 0.05 which is obtained using single column statistics and the independence assumption, (i.e., 1 out of 4 rows qualify in COLX and 1 out of 5 rows qualify in COLY, whereby ¼*⅕=0.05).

A multi-column frequent value indicates the frequency that a value, derived by concatenating multiple columns, occurs, 632 (FIG. 6A). For example, given the predicates:

COLX=3 AND COLY=5 AND COLZ=8 the selectivity for those predicates can be estimated using the following multi-column frequent value:

| Concatenated Column Value | Frequency |
|---|---|
| (3,5,8) | 10% |

It should be noted that the frequency of the concatenated values is determined by the database management system which examines a sample set of the actual values in the database.

Using this multi-column frequent value, the selectivity can be determined for the set of equal predicates to be 10%. If the value that was of interest did not match any of the frequent values, the selectivity could still be estimated by summing the non-matching frequencies, subtracting that frequency from 100% and dividing the result by the multi-column cardinality (less the number of non-matching frequent values).

A system, method, and program can utilize either the multi-column cardinality statistic or the multi-column frequent value statistic to determine selectivity, 662 (FIG. 6B) as illustrated according to the following logic flow:

Logic to estimate the selectivity for multiple equal predicates 661 (FIG. 6B) containing known literals using multi-column frequent value statistics.

Identify the set of equal predicates that contain known literals

If set contains <=1 predicate Then
    Exit
Else
    Continue
If there are no multi-column frequent value statistics containing the same columns as the predicates Then
    Exit
Else
    Continue
    If all literals in the predicate match the literals in the multi-column frequent value Then
    Selectivity is equal to the frequency of the multi-column frequent value
Else
    Calculate Selectivity as:

$$\frac{(1 - \text{SUM(Frequency of all 'Multi-column' Frequent Values))}}{\text{'Multi-column' Cardinality} - \text{Number of 'Multi-column' Frequent Values}}$$

Copyright IBM Corporation 1996

Logic to estimate the selectivity for multiple equal predicates (may contain literals, host variables, parameter markers, etc.) 661 (FIG. 6A) using multi-column cardinality statistics.

Identify the set of equal predicates
If set contains <=1 predicate Then
   Exit
Else
   Continue
If there are no multi-column cardinality statistics containing the same columns as the predicates Then
   Exit
Else
   Continue
   Calculate Selectivity as:

$$\frac{1}{\text{'Multi-column' Cardinality}}$$

Copyright IBM Corporation 1996

'Linear' Correlation Statistics

Some useful types of statistics when dealing with a single range predicate are quantile, or equi-depth histogram, statistics 640, 646 (FIG. 6A–6B). These statistics give an indication of the number of rows between two given values. Multi-column quantile statistics can be very useful when dealing with 'linear' correlation. For example, given the predicates:

COLX=3 AND COLY BETWEEN 2 AND 9 and the following multi-column quantile statistics, (see 642, FIG. 6A:).

| Low Multi-column Value | High Multi-column Value | Frequency | Card |
|---|---|---|---|
| (1,1) | (2,7) | 10% | 10 |
| (2,8) | (3,1) | 10% | 5 |
| (3,2) | (3,5) | 10% | 4 |
| (3,6) | (4,7) | 10% | 17 |
| (4,8) | (6,3) | 10% | 25 |
| (6,4) | (6,9) | 10% | 5 |
| (7,0) | (7,7) | 10% | 7 |
| (7,8) | (8,2) | 10% | 10 |
| (8,3) | (9,7) | 10% | 14 |
| (9,8) | (9,9) | 10% | 2 | it can be seen that all the rows in the quantile bounded by (3,2) and (3,5) satisfy the predicates, and some of the rows in the quantile bounded by (3,6) and (4,7) satisfy the predicates. For quantiles that completely satisfy the predicates, the 'Frequency' can be used as an indication of the number of rows that satisfy the predicates. For quantiles that partially satisfy the predicates an interpolation formula (shown and discussed below) is needed to calculate what percentage of the quantile satisfies the predicates.

It should be clarified that the total range ((1,1) to (9,9)) is divided into quantiles or sub-ranges. The first range is from ((1,1) to (2,7)), and the second range is from ((2,8), (3,1)), etc. The ranges are selected so that there is approximately an even distribution of data within each range, 641 (FIG. 6A.). Also, it should be noted that in the above table "Card" refers to cardinality which is the number of distinct values in a range.

In this example, the selectivity is calculated as follows:
   Final Selectivity=Selectivity of Fully Qualified Quantiles+Selectivity of Partially Qualified Quantiles

=10%+2.8%

=12.8%

A description of an interpolation formula (discussed above) for finding the selectivity of partially qualified quantiles is as follows.
Interpolation Formula (for linear statistics)

For >, ≥

$$FF = \frac{(card - 3)*(HIGHVAL - \text{'lit'}) + (2*(HIGHVAL - LOWVAL))}{CARD*(HIGHVAL - LOWVAL)}$$

For <, ≤

$$FF = 1 - FF( \ldots \text{from above formula})$$

Where:
   CARD is the number of distinct values for a given column
   HIGHVAL is the 'high' quantile bound
   LOWVAL is the 'low' quantile bound
   'lit' is the value specified in the query
   In the example,

COLX=3 AND COLY BETWEEN 2 AND 9 the partially qualified quantile has the bound (3,6) and (4,7). The portion of that quantile that the query is interested in has the bounds (3,6) and (3,9). Logically then, the interpolation formula can be used for '<=', where the literal value is (3,9). That is, everything <=(3,9) is of interest for this quantile.

The multi-column values are translated into numerical values in order to apply the formula. Assuming that in this case the translation occurs literally (i.e., (3,6) is translated to 36, and (4,7) is translated to 47). In essence the boundaries of a sub-range are being translated by concatenating the set of values of the lower boundary and concatenating the set of values of the higher boundary for the sub-range. These concatenated values are then used in the selectivity determination.

The following result occurs when these values are substituted into the formula:

$$1 - \left\{ \frac{(17-3)*(47-39) + (2*(47-36))}{17*(47-36)} \right\} = .28$$

As a result, 28% of this quantile is of interest. However, since this quantile only contains 10% of the data, this must be factored into the calculation:

0.28*0.1=0.028 or 2.8%

A system, method, and program can utilize the multi-column quantile statistics to determine selectivity as illustrated according to the following logic flow:

Logic to estimate the selectivity for a set of predicates containing one or more equal predicates and one range predicate (and these predicates contain known literals), using multi-column quantile statistics (for 'linear' correlation), 646, 647 (FIG. 6A).

Identify the Set of Predicates
If set contains <=1 predicate Then
   Exit
Else
   Continue
If there are no multi-column quantile statistics containing the same columns as the predicates Then

```
Exit
Else
  Continue
If the range predicate is on the first column of the multi-
  column quantile statistic Then
  Exit
Else
  Continue
  Determine Which Quantiles are Fully or Partially
Matched
If there are partially matched quantiles Then
  Determine Low and High Multi-column literal values for
    the partially matched quantiles, bounding the values by
    the Low and High Multi-column Quantile values
Calculate Selectivity as:
  SUM(Frequency of Fully matched 'Multi-column'
    Quantiles)+SUM(Frequency of Partially matched
    'Multi-column' Quantiles*reduction factor)
    where 'reduction factor' is calculated as:
```

$$\frac{(CARD - 3) * \bigl(\text{High 'Multi-col' Literal} - \text{Low 'Multi-col' Lit}\bigr) + (HQ - LQ)}{CARD * (HQ - LQ)}$$

```
where:
  CARD=Multi-column cardinality
  HQ=High Multi-column Quantile value
  LQ=Low Multi-column Quantile value
Logic to determine if a quantile is fully or partially matched
Do for each Quantile
  Select (range predicate)
    When ('<')
      If High Multi-column Quantile value '<' Multi-column
        literal then Quantile is fully matched
      Else
        If Low Multi-column Quantile value '<' Multi-column
          literal then Quantile is partially matched
    When ('<=')
      If High Multi-column Quantile value '<=' Multi-
        column literal then Quantile is fully matched
      Else
        If Low Multi-column Quantile value '<=' Multi-
          column literal then Quantile is partially matched
    When ('>')
      If Low Multi-column Quantile value '>' Multi-column
        literal then Quantile is fully matched
      Else
        If High Multi-column Quantile value '>' Multi-column
          literal then Quantile is partially matched
    When ('>=')
      If Low Multi-column Quantile value '>=' Multi-
        column literal then Quantile is fully matched
      Else
        If High Multi-column Quantile value '>=' Multi-
          column literal then Quantile is partially matched
    When ('BETWEEN')
      If High Multi-column Quantile value '<=' High Multi-
        column literal and Low Multi-column Quantile value
        '>=' Low Multi-column literal then Quantile is fully
        matched
      Else
        If (Low Multi-column Quantile value '<=' High Multi-
          column literal and Low Multi-column Quantile value
          '>=' Low Multi-column literal) or (High Multi-
          column Quantile value '>=' Low Multi-column lit-
          eral and High Multi-column Quantile value '<='
          High Multi-column literal) then Quantile is partially
          matched
      Otherwise
        Not a range predicate
    End
End
Logic to determine the Low and High Multi-column
bounded literal values for partially matched quantiles
Select (range predicate)
  When ('<' or '<=')
  Do
    Low Multi-column literal=Low Multi-column Quantile
      value
    High Multi-column literal=Multi-column literal
  End
  When ('>' or '>=')
  Do
    Low Multi-column literal=Multi-column literal
    High Multi-column literal=High Multi-column Quan-
      tile value
  End
  When ('BETWEEN')
  Do
    If Low Multi-column literal<Low Multi-column Quan-
      tile value then
    Low Multi-column literal=Low Multi-column Quantile
      value
    If High Multi-column literal>High Multi-column
      Quantile value then
    High Multi-column literal=High Multi-column Quan-
      tile value
  End
  Otherwise
    Not a range predicate
End
```

Copyright IBM Corporation 1996

'Polygonal' Correlation Statistics:

Of the three types of correlation to handle, polygonal correlation is the most complex. It requires a new type of multi-column quantile statistic. It is similar to the multi-column quantile statistic used for 'linear' correlation, but has one significant difference. The multi-column quantile statistics take n-dimensional space (the domain of all possible tuples) and divides it into segments, with a low and high multi-column value defining the ends of each segment. This works well when dealing with 'linear' correlation because the answer set can also be represented by a single segment, bounded by a low and high value. When dealing with 'polygonal' correlation, however, the answer set is characterized by an n-dimensional polygon (within the domain of all possible tuples). Trying to divide the n-dimensional space representing the answer set into segments, while possible, is not practical or efficient, as an unlimited number of segments could be generated.

Another approach is to generate a new type of multi-column quantile statistic, 650 (FIG. 6A). one that divides n-dimensional space into smaller, bounded, n-dimensional sub-spaces, with each sub-space containing approximately the same number of tuples, 651 (FIG. 6A). For example, consider the distribution of tuples shown in FIG. 4.

Figure 4:
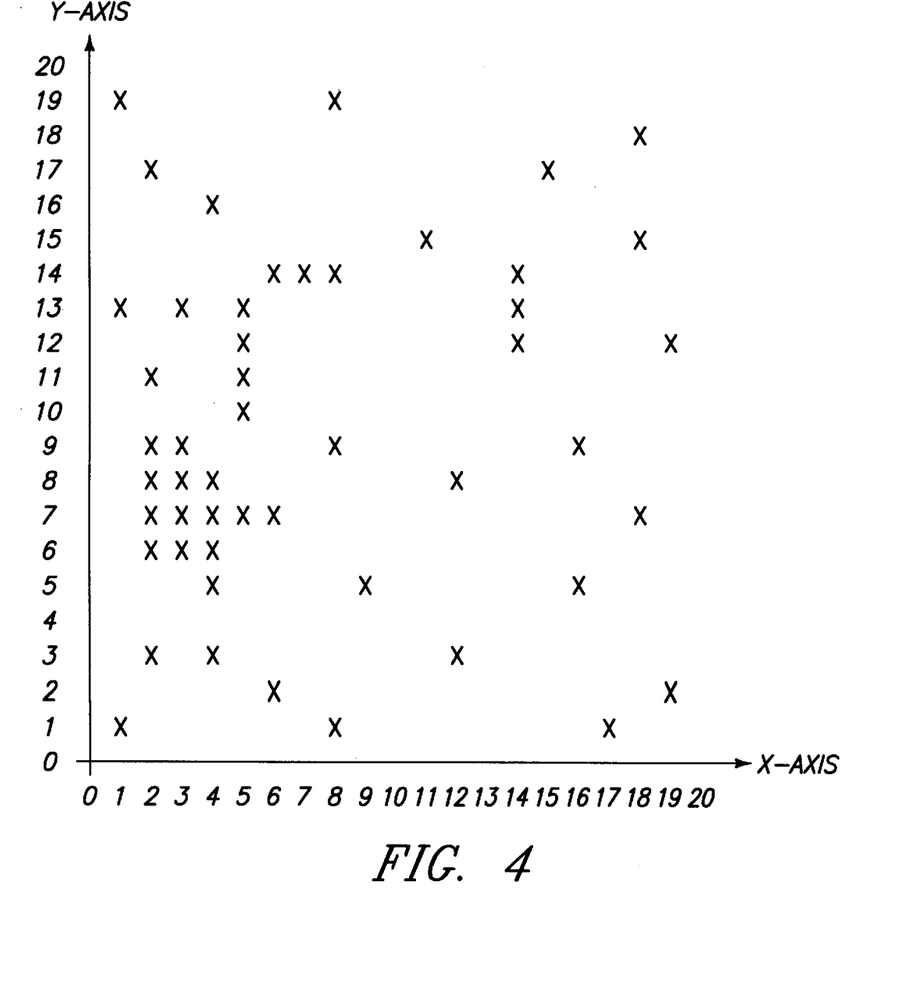
FIG. 4 is a graph representation showing a distribution of tuples for polygonal correlation.

The following multi-column quantile statistics (see 652 (FIG. 6A) divide the space in FIG. 4 into 10 sub-spaces, each space containing approximately the same number of tuples.

| Low Multi-column Value | High Multi-column Value | Frequency | Card |
|---|---|---|---|
| (1,1) | (8,3) | 10% | 5 |
| (2,6) | (2,11) | 10% | 5 |
| (3,5) | (5,7) | 12% | 6 |
| (3,8) | (5,11) | 10% | 5 |
| (4,13) | (1,19) | 10% | 5 |
| (5,12) | (8,14) | 10% | 5 |
| (6,7) | (18,9) | 10% | 5 |
| (18,15) | (8,19) | 10% | 5 |
| (19,1) | (9,5) | 10% | 5 |
| (19,12) | (14,14) | 8% | 4 |

With these statistics, the low and high multi-column values represent opposite corners of an n-dimensional space. Using these two points all of the edges of space can be derived. Now, consider the following predicates:

COLX BETWEEN 3 AND 9 AND COLY BETWEEN 2 AND 10

The answer set for these predicates is bounded by the values (3,2) and (9,10). Using these two points all edges of the space representing the answer set can be derived.

It can then be determined which quantiles are fully contained within the answer set and which are partially contained within the answer set. The selectivity calculation, 656, 657 (FIG. 6B), is then very similar to that done for 'linear' correlation.

Final Selectivity=Selectivity of Fully Qualified Quantiles+Selectivity of Partially Qualified Quantiles

=12%+16.3%

=28.3%

In some cases, a simplified version of 'multi-column quantile statistics' may be sufficient. This would consist of collecting just one quantile with the low value representing the lowest, or second lowest value, in the domain of all tuples, and the high value representing the highest, or second highest value, in the domain of all tuples. Also, the multi-column cardinality must be collected. If the data is uniformly distributed then interpolating using the low and high bounds of the answer set, the low and high bounds of the domain, and the cardinality of the domain, should produce a reasonable estimate.

If the data is not uniformly distributed, but instead characterized by a small number of frequent values, then using the above statistics in conjunction with multi-column frequent values can improve the estimation in that case.

This technique can also be applied to 'linear' correlation.

Interpolation Formula (for polygonal statistics)

The interpolation formula using polygonal statistics uses the same principles as for linear statistics, but it is a little more complex. The added complexity comes in because the formula must take the multi-dimensional aspect of the data into account as follows:

$$\frac{(X1 - X2 + 1)*(Y1 - Y2 + 1)*(Z1 - Z2 + 1) \ldots}{(XA - XB + 1)*(YA - YB + 1)*(ZA - ZB + 1) \ldots} \begin{array}{l}\leftarrow \text{Query area} \\ \leftarrow \text{Quantile area}\end{array}$$

Where:

X1, X2 are the high and low bounds for the X-coordinate of the query

Y1, Y2 are the high and low bounds for the Y-coordinate of the query

Z1, Z2 are the high and low bounds for the Z-coordinate of the query

... etc., for each coordinate (dimension) of the query

XA, XB are the high and low bounds for the X-coordinate of the quantile

YA, YB are the high and low bounds for the Y-coordinate of the quantile

ZA, ZB are the high and low bounds for the Z-coordinate of the quantile

... etc., for each coordinate (dimension) of the quantile

Finding the partially qualified quantiles and Query Bounds for each quantile requires determining all the edges and corners of the quantile. Given two opposite corners of an n-dimensional space (i.e., quantile bounds or query bounds), the other corners that define that space can be determined by finding all possible combinations of the co-ordinates for those two corners.

For example, given the corners (3,2) and (9,10), the other corners that define that 2-dimensional space are:

(3,10)

(9,2)

The number of corners is equal to (2**number of dimensions). For a 2 dimensional space there will be 4 corners. For a 3 dimensional space there will be 8 corners. For a 4 dimensional space there will be 16 corners.

The query bounds for partially qualified quantiles can then be determined by comparing the coordinate values of the corners of the two areas. If corners of the query area fall outside the quantile area then the corner of the quantile area is used. If corners of the quantile area fall outside the query area, then the corners of the query area are used. Consequently, the area in common, between the query area and the quantile area, is obtained.

Using the example above, the following quantiles are partially qualified by the query.

| Quantile Bounds | Frequency | Query Bounds |
|---|---|---|
| (1,1) (8,3) | 10% | (3,2) (8,3) |
| (3,8) (5,11) | 10% | (3,8) (5,10) |
| (6,7) (18,9) | 10% | (6,7) (9,9) |
| (19,1) (9,5) | 10% | (9,2) (9,5) |

By substituting into the formula:

$$\frac{(8-3+1)*(3-2+1)}{(8-1+1)*(3-1+1)} = 0.5*.1 = .05$$

$$\frac{(5-3+1)*(10-8+1)}{(5-3+1)*(11-8+1)} = .75*.1 = .075$$

$$\frac{(9-6+1)*(9-7+1)}{(18-6+1)*(9-7+1)} = .3077*.1 = .0307$$

$$\frac{(9-9+1)*(5-2+1)}{(19-9+1)*(5-1+1)} = .07272*.1 = .007272$$

.05 + .075 + .03077 + .0072 = .1630 or 16.3% of partially qualified quantiles

Collecting Multi-Column Statistics

Collecting multi-column statistics, 611 (FIG. 6A), involves the same type of processing required to collect single column statistics, however, it must be known beforehand which sets of columns are to be concatenated to form the basis for the multi-column statistics. Since indexes provide a logical grouping of columns, and also provide ordering that simplifies the collection process, it seems natural to look to the indexes first as the basis for collecting multi-column statistics.

However, just as is often done in order to collect single column statistics on non-index columns, multi-column statistics can be collected on non-indexed columns by first taking a random sample of the data then extracting the columns of interest, then sorting the sample on those columns. Once there is an ordered set of rows in the sample, the collection process is identical to the process for collecting statistics on indexed columns.

Collecting Multi-column Cardinalities

Multi-column cardinalities are collected 620 (FIG. 6A) by simply counting the number of distinct values that occur when reading an ordered set of those values, 622 (FIG. 6A). The 'value' in this case is the concatenation of individual column values. The following example illustrates this process:

| COLX | COLY | Concatenated Value |
|---|---|---|
| 1 | 5 | 15 |
| 1 | 5 | 15 |
| 2 | 4 | 24 |
| 3 | 2 | 32 |
| 3 | 3 | 33 |
| 4 | 1 | 41 |
| 4 | 1 | 41 |
| | | 5 distinct values (cardinality) |

Multi-column cardinalities are stored as rows in a table (typically a catalog table), 612 (FIG. 6A), and contain the following information:

Table name or identifier
Number of columns concatenated together
List of column identifiers
Cardinality Collecting Multi-Column Frequent Values Multi-column frequent values are collected 630 (FIG. 6A) in the same way that single column frequent values are collected, however, the value that is used is the concatenation of individual column values.

Multi-column frequent values are stored as rows in a table (typically a catalog table), 612 (FIG. 6A), and contain the following information:

Table name or identifier
Number of columns concatenated together
List of column identifiers
Concatenated column value
Frequency that the concatenated column value occurs Collecting Multi_Column Quantile Statistics for 'Linear' Correlation Multi-column quantile statistics can be collected 640 (FIG. 6A) using either a static or dynamic process. The static process makes two passes at reading the ordered set of rows. The first pass simply counts the total number of rows. If this is already known, then this pass is not needed.

Once the total number of rows is known, the number of rows belonging to each quantile can be obtained by dividing the total number of rows by the number of quantiles desired. For example, if the total number of ordered rows is 1000, and 10 quantiles are desired, then each quantile should contain 100 rows (1000/10).

The ordered set of rows is then read. The bounds of each quantile is set such that each quantile contains the desired number of rows. Consequently, the size, i.e., boundaries, of each quantile may vary depending upon the distribution of the data.

When using the dynamic process, only one pass of the ordered set of rows is needed. During that pass the desired number of rows in each quantile, and the low and high bounds of each quantile, are dynamically adjusted as needed so that each quantile contains approximately the same number of rows. This algorithm might result in the last quantile being larger or smaller than the rest, but it saves one scan of the ordered set of rows (if the total number of rows isn't known).

Multi-column quantile statistics are stored as rows in a table (typically a catalog table), 612(FIG. 6A), and contain the following information.

Table name or identifier
Number of columns concatenated together
List of column identifiers
Low concatenated column value
High concatenated column value
Frequency
Cardinality Collecting Multi_Column Quantile Statistics for 'Polygonal' Correlation Finding an efficient process for collecting multi-column quantile statistics for use with 'polygonal' correlation is quite complex. However, the statistics, once collected, 650 (FIG. 6A), can be stored in the same way as 'linear' correlation statistics. That is, they can be stored as rows in a table, 612 (FIG. 6A), containing the following information.

Table name or identifier
Number of columns concatenated together
List of column identifiers
Low concatenated column value
High concatenated column value
Frequency
Cardinality If the simplified version of 'multi-column quantile statistics', where only one quantile is collected, is used, then the collection process is very simple. When reading an ordered set of rows the low and high value for each column is determined and used to form the low and high multi-column values (the bounds of the quantile). The number of distinct multi-column values is also determined when reading this ordered set of rows. If the data is characterized by a small number of frequent values, then those values can also be collected when reading the ordered set of rows.

Using Multi-Column Statistics

As described earlier, the purpose for collecting multi-column statistics is to remove the independence assumption made by the optimizer when estimating the number of qualified rows (i.e., selectivity value), 662, 647, 657 (FIG. 6A). in order to arrive at an estimate that would be more accurate.

The four main times during query optimization where the independence assumption is made are: 1) When estimating the selectivity of an index for single table access; 2) When estimating the number of qualified rows in a table for single table access; 3) When estimating the selectivity of an index for join access; and 4) When estimating the number of qualified rows in a table for join access.

The primary difference between these four cases is the set of predicates involved. When estimating the selectivity of an index for single table access, only local predicates are considered. When estimating the selectivity for join access, both local predicates and eligible join predicates are considered. The same is true for the other two cases when estimating the number of qualified rows in a table.

Multi-column statistics can be used in all four cases. If the local predicates contain literals then multi-column frequent values or multi-column quantile statistics can be used in place of the independence assumption. For join predicates and local predicates that don't contain literals, multi-column cardinalities can often be used be used in place of the independence assumption.

As discussed above, multi-column statistics can, in many cases, improve the accuracy when estimating the number of qualified rows for a particular query. Consequently, there is a greater likelihood that the most efficient access path will be selected when these statistics are available to the optimizer. An improved estimate for the number of qualified rows can be beneficial also in the area of database design, e.g., when an index is not efficient, and for other purposes.

It should be noted that the types of correlation shown herein all deal with multiple columns of the same table (i.e., 'intractable' correlation). The statistics used herein have been designed for this type of correlation, where all of the columns are within the same table. Queries can, however, suffer from 'linter-table' correlation, where there is a relationship between columns of different tables. This type of correlation predominately effects join size estimation which is not addressed herein.

Query Processing System

Figure 5A:
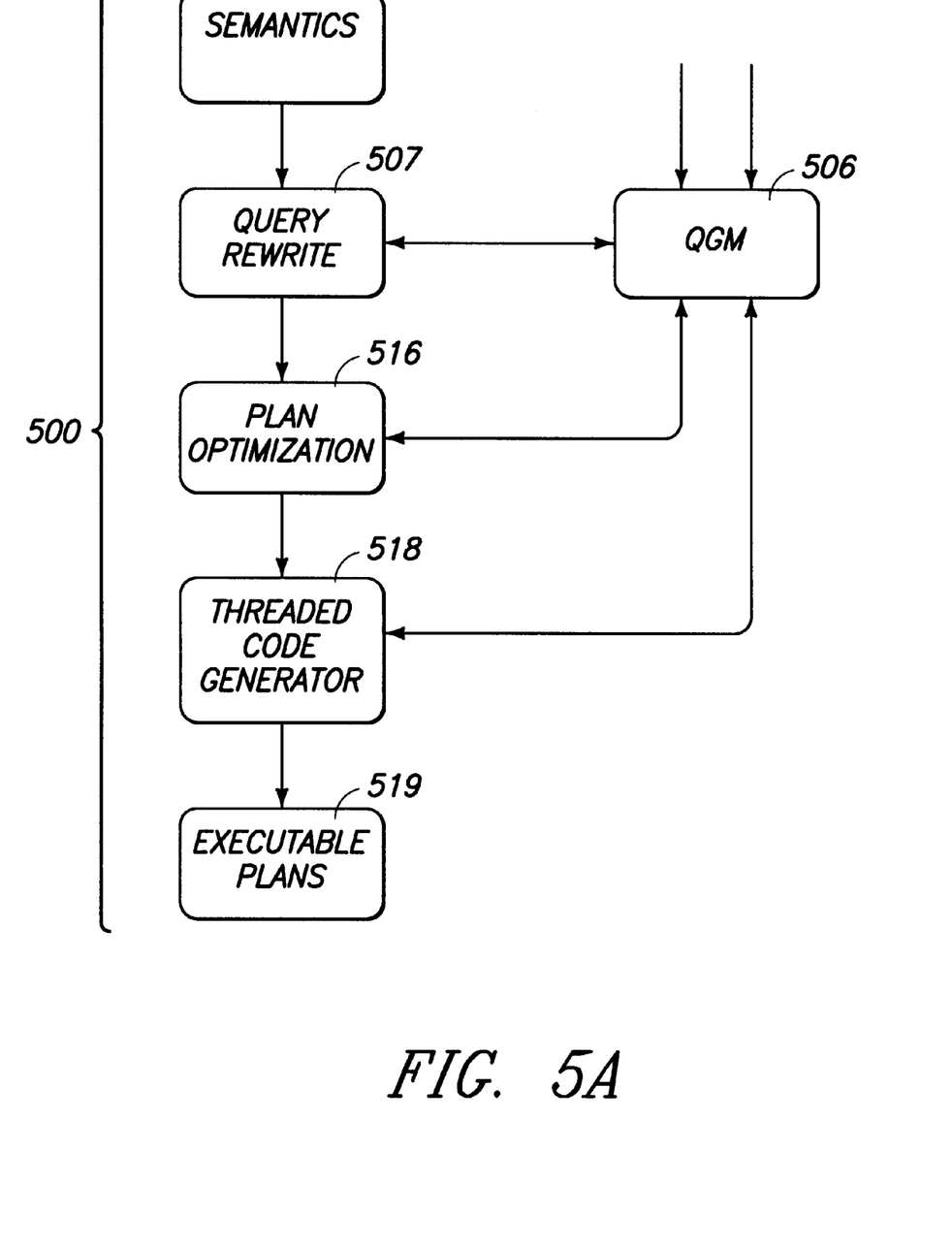
FIG. 5A is a query processing system.

The above described preferred embodiment can be implemented in a query optimizer or query processing system. The following describes an example of one such SQL query processing system with reference to FIGS. 5A and 5B. An application 501 issues SQL queries 503 that are parsed by the SQL parser component 505. The parser 505 generates an internal representation of the query called a query graph, i.e. a data structure (query graph model, QGM) 506. The QGM 506 is passed to the query global semantics 512, the query rewrite component 507, and the plan optimization 516. The query rewrite engine 507 applies transformations to rewrite the query. After the rewrite phase, 507, the query graph 506 is revised and used by the optimization phase 516. Each query is then translated into an executable plan 519 through a threaded code generator 518.

Figure 5B:
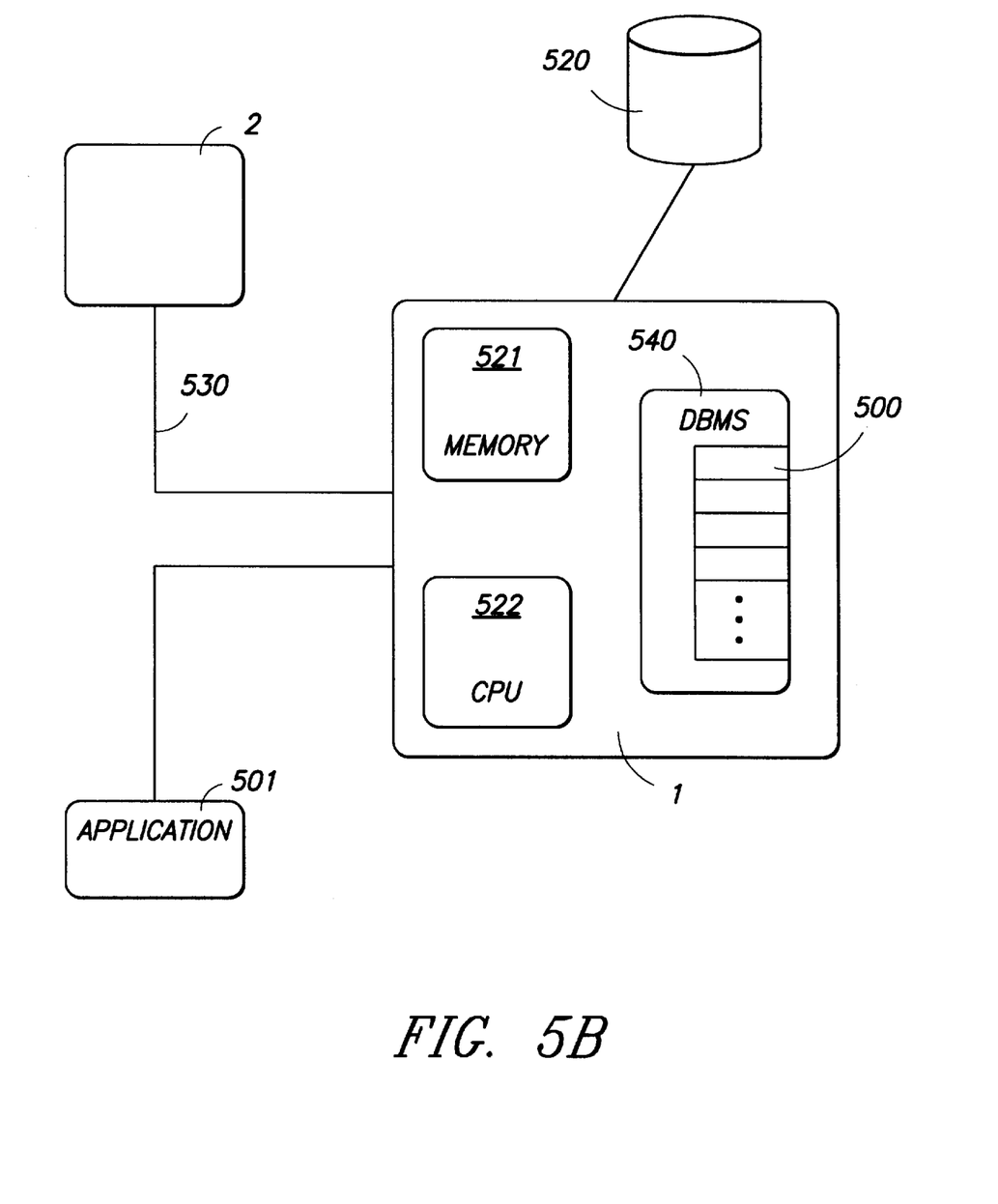
FIG. 5B is a query processing system in a networked environment.

FIG. 5B shows the context of the query engine 500 in a database management system (DBMS) 540 in a processing system 1 having memory 521 and at least one cpu 522. The system 1could be connected to other systems 2 via a network 530. The application 501 could be resident on any of the systems 1, 2, in the network or could be any user connected to any one of the systems via input/output user interface devices (e.g., keyboard, display, etc.). The system, method and program of this invention is applicable to any type of database management system whether it is contained within a single system or is within a networked environment including parallel processing systems, client/server processing systems, distributed systems, etc. Although the invention herein is described in reference to relational database management systems, multi-column statistics are applicable and adaptable to other database systems including object oriented systems. For example, the invention is easily adaptable to take into consideration a correlation and relationship among objects such as through multi-object statistics similar to the multi-column statistics described herein.

Using the foregoing specification, the invention may be implemented as a machine, process, or article of manufacture by using standard programming and/or engineering techniques to produce programming software, firmware, hardware or any combination thereof.

Any resulting program(s), having computer readable program code, may be embodied within one or more computer usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using or selling the invention.

Memory devices include, but are not limited to, fixed (hard) disk drives, diskettes, optical disks, magnetic tape, semiconductor memories such as RAM, ROM, Proms, etc. Transmitting devices include, but are not limited to, the internet, intranets, electronic bulletin board and message/note exchanges, telephone/modem-based network communication, hard-wired/cabled communication network, cellular communication, radio wave communication, satellite communication, and other stationary or mobile network systems/communication links.

A machine embodying the invention may involve one or more processing systems including, but not limited to, cpu, memory/storage devices, communication links, communication/transmitting devices, servers, I/O devices, or any subcomponents or individual parts of one or more processing systems, including software, firmware, hardware or any combination or subcombination thereof, which embody the invention as set forth in the claims.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention.

While the preferred embodiment of the present invention has been illustrated in detail, it should be apparent that modifications and adaptations to that embodiment may occur to one skilled in the art without departing from the spirit or scope of the present invention as set forth in the following claims.

We claim:

1. A method for use in a database management system for optimizing a query, the method comprising:

collecting at least one type of multi-column statistic to reflect a relationship among multiple selected non-indexed columns of a table, wherein the step of collecting at least one type of multi-column statistic further comprises collecting a first type of multi-column quantile statistics for indicating a number of rows between two given values by dividing the data into a plurality of sub-ranges, each sub-range having an even distribution of data, and determining a frequency and cardinality of each sub-range; and storing the at least one type of multi-column statistic in a table for subsequent use in determining a selectivity value (a number of qualified rows) for predicates in the query, wherein the selectivity value is used in optimizing execution of the query.

2. The method of claim 1 wherein the step of collecting collects a different type of multi-column statistic for each type of column correlation.

3. The method of claim 1 wherein the step of collecting at least one type of multi-column statistic further comprises concatenating columns to collect a multi-column cardinality statistic by counting a number of distinct concatenated column values as the at least one type of multi-column statistic.

4. The method of claim 1 wherein the step of collecting at least one type of multi-column statistic further comprises concatenating non-indexed columns to create a multi-column frequent value statistic as the at least one type of multi-column statistic.

5. The method of claim 3 further comprising accessing the table for the multi-column cardinality statistic for the multiple columns having equal predicates in the query and determining the selectivity value as "1 divided by the multi-column cardinality statistic".

6. The method of claim 4 further comprising accessing the table, and
   if there are multi-column frequent value statistics containing a same plurality of columns as a plurality of equal predicates in the query, and
   if literals in the predicates match literals in the stored multi-column frequent value, then
      determining the selectivity value as being equal to a frequency of the multi-column frequent value.

7. The method of claim 4 further comprising accessing the table, and
   if there are multi-column frequent value statistics containing a same plurality of columns as a plurality of equal predicates in the query, and
   if literals in the predicates do not match literals in the stored multi-column frequent value, then
      determining the selectivity value as:

$$\frac{(1 - \text{SUM}(\text{Frequency of all multi-column frequent values}))}{(\text{"multi-column" cardinality}) - (\text{number of "multi-column" frequent values})}.$$

8. The method of claim 1 further comprising accessing the table for the first type of multi-column quantile statistics for the multiple columns for the query having a single range predicate and at least one equal predicate to determine the selectivity value for the predicates of the query.

9. The method of claim 8 further comprising determining the selectivity value as follows:
   for predicates that are completely satisfied by one of the plurality of sub-ranges, the selectivity is the frequency;
   for predicates that are partially satisfied by one of the sub-ranges, a final selectivity is equal to a selectivity of fully qualified sub-ranges plus a selectivity of partially qualified sub-ranges.

10. The method of claim 9 wherein the step of determining, for predicates that are partially satisfied by one of the sub-ranges, further comprises translating a boundary of a sub-range by concatenating a set of values of a lower boundary and concatenating a set of values of a higher boundary for the sub-range; and using the concatenated values in the selectivity determination.

11. A method for use in a database management system for optimizing a query, the method comprising:
   collecting at least one type of multi-column statistic to reflect a relationship among multiple selected non-indexed columns of a table, wherein the step of collecting at least one type of multi-column statistic further comprises collecting a second type of multi-column quantile statistics for indicating a number of rows between two given sets of values by dividing the data into a plurality of sub-spaces, each sub-space containing approximately a same number of tuples, and determining a frequency and cardinality of each sub-space; and
   storing the at least one type of multi-column statistic in a table for subsequent use in determining a selectivity value (a number of qualified rows) for predicates in the query, wherein the selectivity value is used in optimizing execution of the query.

12. The method of claim 11 further comprising accessing the table for the second type of multi-column quantile statistics for the multiple columns for the query having a plurality of range predicates to determine the selectivity value for the predicates of the query.

13. The method of claim 12 wherein the step of determining the selectivity further comprises determining a final selectivity as being equal to a selectivity of fully qualified sub-spaces plus a selectivity of partially qualified sub-spaces.

14. The method of claim 13 wherein the selectivity of partially qualified sub-spaces is determined according to the following:

$$\frac{(X1 - X2 + 1) * (Y1 - Y2 + 1) * (Z1 - Z2 + 1)\ldots}{(XA - XB + 1) * (YA - YB + 1) * (ZA - ZB + 1)\ldots} * \text{frequency for quantile}$$

Where:
   X1, X2 are the high and low bounds for the X-coordinate of the query
   Y1, Y2 are the high and low bounds for the Y-coordinate of the query
   Z1, Z2 are the high and low bounds for the Z-coordinate of the query
   ... etc., for each coordinate (dimension) of the query
   XA, XB are the high and low bounds for the X-coordinate of the quantile
   YA, YB are the high and low bounds for the Y-coordinate of the quantile
   ZA, ZB are the high and low bounds for the Z-coordinate of the quantile
   ... etc., for each coordinate (dimension) of the quantile.

15. A database management system comprising:
   means for collecting at least one type of multi-column statistic to reflect a relationship among multiple non-indexed columns of a table, wherein the means for collecting at least one type of multi-column statistic further comprises means for collecting a first type of multi-column quantide statistics for indicating a number of rows between two given values by dividing the data into a plurality of sub-ranges, each sub-range having an even distribution of data, and means for determining a frequency and cardinality of each sub-range; and
   means for storing the at least one type of multi-column statistic in a table for subsequent use in determining a selectivity value (a number of qualified rows) for predicates in the query, wherein the selectivity value is used in optimizing execution of the query.

16. The system of claim 15 wherein the means for collecting collects a different type of multi-column statistic for each type of column correlation.

17. The system of claim 15 wherein the means for collecting at least one type of multi-column statistic further comprises means for concatenating columns to collect a multi-column cardinality statistic; and means for counting a number of distinct concatenated column values as the at least one type of multi-column statistic.

18. The system of claim 15 wherein the means for collecting at least one type of multi-column statistic further comprises means for concatenating non-indexed columns to create a multi-column frequent value statistic as the at least one type of multi-column statistic.

19. The system of claim 17 further comprising means for accessing the table for the multi-column cardinality statistic for the multiple columns having equal predicates in the query; and means for determining the selectivity value as "1 divided by the multi-column cardinality statistic".

20. The system of claim 15 further comprising means for accessing the table for the first type of multi-column quantile statistics for the multiple columns for the query having a single range predicate and at least one equal predicate to determine the selectivity value for the predicates of the query.

21. The system of claim 20 further comprising means for determining the selectivity value as follows:
for predicates that are completely satisfied by one of the plurality of sub-ranges, the selectivity is the frequency;
for predicates that are partially satisfied by one of the sub-ranges, a final selectivity is equal to a selectivity of fully qualified sub-ranges plus a selectivity of partially qualified sub-ranges.

22. The system of claim 21 wherein the means for determining further comprises translating a boundary of a sub-range by concatenating a set of values of a lower boundary and concatenating a set of values of a higher boundary for the sub-range; and using the concatenated values in the selectivity determination.

23. A database management system comprising:
means for collecting at least one type of multi-column statistic to reflect a relationship among multiple non-indexed columns of a table, wherein the means for collecting at least one type of multi-column statistic further comprises means for collecting a second type of multi-column quantile statistics for indicating a number of rows between two given sets of values by dividing the data into a plurality of sub-spaces, each sub-space containing approximately a same number of tuples, and means for determining a frequency and cardinality of each sub-space; and
means for storing the at least one type of multi-column statistic in a table for subsequent use in determining a selectivity value (a number of qualified rows) for predicates in the query, wherein the selectivity value is used in optimizing execution of the query.

24. The system of claim 23 further comprising means for accessing the table for the second type of multi-column quantile statistics for the multiple columns for the query having a plurality of range predicates to determine the selectivity value for the predicates of the query.

25. The system of claim 24 wherein the means for determining the selectivity further comprises means for determining a final selectivity as being equal to a selectivity of fully qualified sub-spaces plus a selectivity of partially qualified sub-spaces.

26. The system of claim 25 wherein the selectivity of partially qualified sub-spaces is determined according to the following:

$$\frac{(X1-X2+1)*(Y1-Y2+1)*(Z1-Z2+1)...}{(XA-XB+1)*(YA-YB+1)*(ZA-ZB+1)...} * \text{frequency for quantile}$$

Where:
X1, X2 are the high and low bounds for the X-coordinate of the query
Y1, Y2 are the high and low bounds for the Y-coordinate of the query
Z1, Z2 are the high and low bounds for the Z-coordinate of the query
... etc., for each coordinate (dimension) of the query
XA, XB are the high and low bounds for the X-coordinate of the quantile
YA, YB are the high and low bounds for the Y-coordinate of the quantile
ZA, ZB are the high and low bounds for the Z-coordinate of the quantile
... etc., for each coordinate (dimension) of the quantile.

27. Computer programming code residing on at least one computer usable medium (i.e., a program product) for use in a database management system, the program product comprising:
means for causing a collection of at least one type of multi-column statistic to reflect a relationship among multiple non-indexed columns of a table, wherein the means for causing a collection of at least one type of multi-column statistic further comprises means for causing a collection of a first type of multi-column quantile statistics for indicating a number of rows between two given values by dividing the data into a plurality of sub-ranges, each sub-range having an even distribution of data, and means for determining a frequency and cardinality of each sub-range; and
means for causing a storing of the at least one type of multi-column statistic in a table for subsequent use in determining a selectivity value (a number of qualified rows) for predicates in the query, wherein the selectivity value is used in optimizing execution of the query.

28. The program product of claim 27 wherein the means for causing the collection collects a different type of multi-column statistic for each type of column correlation.

29. The program product of claim 27 wherein the means for causing the collection of at least one type of multi-column statistic further comprises means for causing a concatenation of columns to collect a multi-column cardinality statistic; and means for causing a counting of a number of distinct concatenated column values as the at least one type of multi-column statistic.

30. The program product of claim 27 wherein the means for causing a collection of at least one type of multi-column statistic further comprises means for causing a concatenation of non-indexed columns to create a multi-column frequent value statistic as the at least one type of multi-column statistic.

31. The program product of claim 29 further comprising means for causing an access to the table for the multi-column cardinality statistic for the multiple columns having equal predicates in the query; and means for causing a determination of the selectivity value as "1 divided by the multi-column cardinality statistic".

32. The program product of claim 27 further comprising means for causing an access to the table for the first type of multi-column quantile statistics for the multiple columns for the query having a single range predicate and at least one equal predicate to cause a determination of the selectivity value for the predicates of the query.

33. The program product of claim 32 further comprising means for causing a determination of the selectivity value as follows:

for predicates that are completely satisfied by one of the plurality of sub-ranges, the selectivity is the frequency;

for predicates that are partially satisfied by one of the sub-ranges, a final selectivity is equal to a selectivity of fully qualified sub-ranges plus a selectivity of partially qualified sub-ranges.

34. The program product of claim 33 wherein the means for causing a determination further comprises means for causing a translation of a boundary of a sub-range by concatenating a set of values of a lower boundary and concatenating a set of values of a higher boundary for the sub-range; and means for using the concatenated values in the selectivity determination.

35. Computer programming code residing on at least one computer usable medium (i.e., a program product) for use in a database management system, the program product comprising:

means for causing a collection of at least one type of multi-column statistic to reflect a relationship among multiple non-indexed columns of a table, wherein the means for causing a collection of at least one type of multi-column statistic further comprises means for causing a collection of a second type of multi-column quantile statistic for indicating a number of rows between two given sets of values by dividing the data into a plurality of sub-spaces, each sub-space containing approximately a same number of tuples, and means for causing a determination of a frequency and cardinality of each sub-space; and means for causing a storing of the at least one type of multi-column statistic in a table for subsequent use in determining a selectivity value (a number of qualified rows) for predicates in the query, wherein the selectivity value is used in optimizing execution of the query.

36. The program product of claim 35 further comprising means for causing an access to the table for the second type of multi-column quantile statistics for the multiple columns for the query having a plurality of range predicates; and means for causing a determination of the selectivity value for the predicates of the query.

37. The system of claim 36 wherein the means for causing the determination of the selectivity value further comprises means for causing a determination of a final selectivity as being equal to a selectivity of fully qualified sub-spaces plus a selectivity of partially qualified sub-spaces.

* * * * *